United States Patent [19]

Remley

[11] 4,048,001
[45] Sept. 13, 1977

[54] POLYURETHANE TEXTILE ADHESIVE

[75] Inventor: Kenneth Herald Remley, Warren, N.J.

[73] Assignee: American Cyanamid Company, Stamford, Conn.

[21] Appl. No.: 555,670

[22] Filed: Mar. 5, 1975

Related U.S. Application Data

[63] Continuation-in-part of Ser. No. 322,334, Jan. 10, 1973, abandoned.

[51] Int. Cl.$^2$ ................... C08G 18/12; C08G 18/34
[52] U.S. Cl. .................... 156/331; 260/29.2 TN; 260/29.6 NR; 260/31.6; 260/859 R; 427/206; 428/90; 428/425
[58] Field of Search ................. 260/29.2 TN; 156/331

[56] References Cited

U.S. PATENT DOCUMENTS

| | | | |
|---|---|---|---|
| 2,968,575 | 1/1961 | Mallonee | 260/29.2 TN |
| 3,401,133 | 9/1968 | Grace et al. | 260/29.2 TN |
| 3,410,817 | 11/1968 | McClellan | 260/29.2 TN |
| 3,412,054 | 11/1968 | Milligan et al. | 260/29.2 TN |
| 3,539,482 | 11/1970 | Stewart | 260/29.2 TN |
| 3,640,924 | 2/1972 | Hermann et al. | 260/29.2 TN |

FOREIGN PATENT DOCUMENTS

| | | | |
|---|---|---|---|
| 1,076,688 | 7/1967 | United Kingdom | 260/29.2 TN |

Primary Examiner—Murray Tillman
Assistant Examiner—A. H. Koeckert
Attorney, Agent, or Firm—H. G. Jackson; Morton Friedman; Albert L. Gazzola

[57] ABSTRACT

Textile adhesive compositions. More particularly, aqueous adhesive compositions comprising a plasticizing agent and a dispersed polyurethane polymer, the method of using the adhesive composition in textile applications and the textile materials thus obtained.

11 Claims, No Drawings

4,048,001

POLYURETHANE TEXTILE ADHESIVE

CROSS-REFERENCE TO RELATED APPLICATION

This is a continuation-in-part of copending application Ser. No. 322,334, filed Jan. 10, 1973, now abandoned.

BACKGROUND OF THE INVENTION

The invention relates to adhesives for textiles. More particularly, it relates to aqueous polyurethane bonding adhesives for laminating and flocking textile materials.

Laminating involves the bonding of fabrics, both synthetic and natural, either to one another or to other plastic materials to form a multilayer product. Flocking involves the bonding of short, cut fibers in a perpendicular position to a substrate to form a pile-like material.

As indicated above, laminating in the textile field means the bonding of a fabric to the same or different fabric or fabrics or the bonding of one or more fabrics to plastic materials, including films, sheetings, and foams.

A discussion of the background in the area of adhesives, is given in U.S. Pat. No. 3,640,924, and in the related commonly assigned, copending applications, Ser. Nos. 184,609; 184,610; 275,392; and 275,393; filed respectively Sept. 28, 1971; Sept. 28, 1971; July 26, 1972; and July 26, 1972.

Adhesive compositions in the textile field are applied both as flocking and laminating adhesives. In the present invention, the primary application is for flocking applications although other uses include bonding applications for laminates.

The adhesives used in textile laminating and flocking should provide products having (1) dimensional stability to washing, dry cleaning and pressing, (2) durability of the bond between the components to washing, dry cleaning and pressing and (3) satisfactory handle and drape characteristics. In the apparel field, resistance to dry cleaning and/or laundering are important, but is is particularly important that the flocked garment have a soft hand. Furthermore, the adhesive composition must be applicable by the conventional methods for applying adhesive to fabrics, or plastics materials, as by doctor blade technique or by using a plain or gravure transfer roll. The adhesive should be sufficiently viscous to prevent penetration into the fabric or foam. It should be flexible, even when fully cured, and should not become brittle on aging. Although many of the adhesives currently used have a solvent base, aqueous base adhesives are desirable since (1) they can be diluted with water for cleaning purposes, (2) they do not present a fire or explosive hazard, (3) they have less odor and are non-toxic and (4) present no air pollution problems.

The general disclosure of U.S. Pat. No. 3,640,924 which is hereby incorporated by reference, discloses a method for preparing a textile adhesive composition wherein an isocyanate-terminated prepolymer is converted into a latex by stirring it in an aqueous medium containing a tertiary lower alkylamine, allowing chain extension with water to proceed until substantially all of the isocyanate groups have reacted and adding a thickening agent to the latex to adjust the viscosity from 20,000 to 100,000 cps. This composition is useful in flocking processes, however, it cannot be used to make flocked fabrics because textile materials thus obtained have a boardy hand.

Other pertinent prior art references are U.S. Pat. Nos. 3,388,087 and 3,412,054.

SUMMARY OF THE INVENTION

An aqueous adhesive composition has now been discovered which is eminently useful as a textile flocking adhesive for apparel in that the resulting flocked material has a soft hand in addition to the required durability to washing and dry cleaning. It is also useful as a bonding adhesive for non-woven fabrics, and it may be used as a textile finishing agent, such as a hand modifier, a wrinkle recovery enhancer, or a tear and tensile strength improver for woven and knitted fabrics.

DETAILED DESCRIPTION OF THE INVENTION

The adhesive compositions of this invention are aqueous dispersions of a particular class of self-dispersible or emulsifiable polyurethane polymers containing a plasticizing agent. The aqueous dispersions are obtained by adding a certain class of isocyanate-terminated polyurethane prepolymers having pendant carboxyl groups to water containing a tertiary aliphatic amine and allowing chain extension with water to proceed until all of the isocyanate groups have been reacted. The resulting polyurethane latex is thickened to the desirable viscosity with suitable thickening agents.

The isocyanate-terminated polyurethane prepolymers having pendant carboxyl groups are prepared by reacting an organic diisocyanate with a slight molecular deficiency of three types of hydroxy compound.

The first type of hydroxy compound is a nonpolymeric glycol containing a pendant carboxyl group, the second type is a conventional nonpolymeric polyol, and the third type is a conventional polyalkylene ether glycol, or mixture of such glycols.

The organic diisocyanate is an aromatic diisocyanate having the isocyanate groups directly attached to the aromatic ring, such as the tolylene diisocyanate and mixtures thereof. The diisocyanates may contain other substituent groups, although those free of such groups are preferred.

The nonpolymeric glycol containing a pendant carboxyl group has the formula (a):

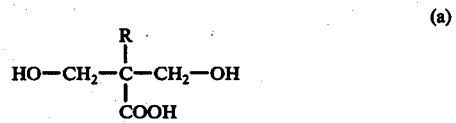

(a)

where R is hydrogen or lower alkyl (1–3 carbon atoms). The glycols of Formula (a) are 2,2-bis(hydroxymethyl) lower alkanoic acids and they include 2,2-bis(hydroxymethyl)acetic aicd, 2,2-bis(hydroxymethyl)propionic, 2,2-bis(hydroxymethyl)-butyric acid, and 2,2-bis(hydroxymethyl)valeric acid. The preferred glycol is 2,2-bis(hydroxymethyl)propionic acid.

The non-polymeric polyol has the formula (b):

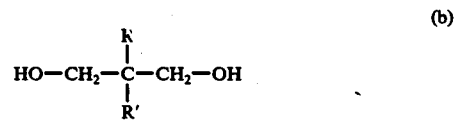

(b)

where R is hydrogen or lower alkyl (1,3-carbon atoms), R' is hydrogen, lower alkyl or hydroxyalkyl. The polyols of Formula (b) are 2-hydroxymethyl-1,3-propanediol, 2-methyl-2-hydroxymethyl-1,3-propanediol, 2-ethyl-2-hydroxymethyl-1,3-propanediol, and the like.

The polyalkylene ether glycol has the formula (c):

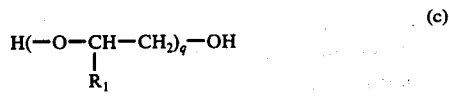

(c)

wherein $R_1$ is hydrogen or lower alkyl and q is an integer sufficiently large to provide an average molecular weight for the glycol of 1750 to 5,000 with a preferred average molecular weight range of about 2,000 to about 3,000. Representative glycols include polyethylene ether glycol, poly-1,2-propylene ether glycol, poly-1,2-butylene ether glycol, and the like.

In preparing the prepolymer, at least 1.0 mole and up to about 1.7 moles (preferably between 1.2 and 1.4 moles) of the diisocyanate per mole of total hydroxy compounds should be used. The molar ratio of nonpolymeric glycol containing a pendant carboxyl group (a) to the nonpolymeric polyol (b), to the polyalkylene ether glycol (c) respectively may range from about 2.0-7.5: 1.0: 2.0-7.5, preferably from about 2.5-5.0: 1.0: 2.5-5.0. The reaction temperature for formation of the prepolymer should be between about 50° C. and 100° C., preferably between 75° C. and 90° C.

The plasticizing agent may be added at the start of the reaction along with the hydroxy compounds or it may be added as an externally emulsified additive after chain extension of the prepolymer has been completed. Adding the plasticizer initially is preferable because it simplifies the process and also facilitates emulsification by increasing the fluidity of the resulting prepolymer phase.

The plasticizing agents useful in this invention are polyesters although phthalate esters, phosphate esters and long chain aliphatic esters can be used. The preferred plasticizing agent is a phthalate polyester (PARAPLEX®-G-30).

The amount of plasticizing agent added should be between 10% and 30%, preferably between 15% and 25% based on the weight of the prepolymer.

The amount of water used with the prepolymer in forming the water-extended polyurethane latex is not critical. Latices of solids content from about 10% up to about 60% can be obtained, although a solids content of 25-50% is preferred. Formation of the latex at room temperature is convenient and practical, although higher or lower temperatures may be used.

The tertiary amine present in the water during the latex formation is a tertiary lower alkylamine including trimethylamine, triethylamine and tripropylamine, preferably triethylamine. The amount of tertiary amine used should be between 2% and 10%, preferably between 3% and 7%, based on weight of prepolymer. Generally, the preferred amount of tertiary amine employed is about 0.65 equivalent for each carboxyl group present in the prepolymer.

Other agents may be added to the adhesive composition during the preparation of the polyurethane prepolymer or after chain extension of the prepolymer. For some uses, it may be desirable to add an antioxidant such as 2,2'-methylene-bis(4-methyl-6-t-butylphenol), and the like, or an ultraviolet absorber such as 5-chloro-2-(3,5-di-t-butyl-2-hydroxyphenyl)-benzotriazole, and the like. For other uses it may be desirable to add a thermosetting aminoplast precondensate, such as a melamine-formaldehyde, urea, or urea-formaldehyde condensate, to improve the solvent resistance of the adhesive. The preferred aminoplast precondensates are melamine formaldehyde condensates, including alkyl ethers thereof. The addition of a monoisocyanate, such as phenyl isocyanate, is useful in reducing yellowing of the finished product.

Small amounts of processing aids such as, defoaming agents, or preservatives such as bactericides, may also be added to the adhesive composition.

Proper viscosity of the adhesive is important to prevent undue penetration of the adhesive into the substrate to which it is being applied. In other words, the bulk of the adhesive should remain on the surface of the substrate to provide good adhesion between flock and substrate. Thickening agents may be added to achieve the proper viscosity. The preferred thickening agent is an acid-containing, cross-linked acrylic copolymer emulsion, such as a copolymer of polyacrylic acid and a polyacrylate (ACRYSOL® ASE-60). Viscosities in the range of 500 to 150,000 cps. are normally employed.

For further discussion on this, refer also to previously cited patent references in the adhesive art.

The following examples are set forth to illustrate the invention.

EXAMPLE 1

Ingredients of Prepolymer:2000 MW PPG, 4.0% DMPA, 0.82% TMP, 20% Plasticizer NCO/OH=1.3.

A mixture of 270.0 parts of polypropylene glycol of 2,000 MW, 92.0 parts of PARAPLEX® G-30 (a polyester-type plasticizer of Rohm and Haas), 18.0 parts of 2,2-bis-(hydroxymethyl)propionic acid, 3.75 parts of 2-ethyl-2-hydroxymethyl-1,3-propanediol, 1.75 parts of 5-chloro-2-(3, 5-di-t-butyl-2-hydroxyphenyl)benzotriazole, and 0.9 parts of 2,2'-methylene-bis-(4-methyl-6-t-butylphenol) was stirred and heated to 80°-85° C.; 67.5 parts of tolylene diisocyanate was added thereto slowly and the mixture, was stirred at 80°-85° C. for 4-5 hours. An amount of 200.0 parts of the prepolymer was emulsified by adding it to a mixture of 3.88 parts of triethylamine and 230 parts of cold water then chain-extended by stirring for about 15 hours at room temperature, and then filtered through a 100 mesh screen to obtain a latex having a solids content of about 49.6%.

To 270.0 parts of the chain-extended polymer latex was added 0.790 part of concentrated ammonium hydroxide and a dispersion of 9.15 parts of ACRYSOL® ASE-60 (commerical polyacrylic-type thickening agent of Rohm and Haas Co.) in 54 parts of water and the mixture was stirred to complete emulsification. The viscosity of the emulsified adhesive was adjusted to about 48,000 cps. and the solids content of about 40% by the addition of water.

EXAMPLE 2

This example demonstrates a flocking operation using the adhesive of Example 1

The adhesive composition of Example 1 was applied by knife coater to cotton twill employing a 10-mil thickness of wet adhesive. A rayon flock of 1.0 mm. length was sifted onto the wet adhesive within 15-30 seconds and the flock was then oriented by means of a beater-bar. The flocked fabric was dried at 305° to 310° F. for 5 minutes and the loose flock as removed by blowing a stream of air. The flock was securely bonded to the substrate and had a soft texture. The fabric was evaluated using Taber Abraser CS-10 wheels with a 500 gram load.

After 500 wet cycles and tumble drying, the appearance of the flocked fabric was rated "good."

EXAMPLE 3

This example illustrates a process wherein the plasticizer is added after chain-extension and comparison is made to a sample without plasticizer. Ingredients of prepolymer:

2000 MW PPG. 6% DMPa. 1% TMP, NCO/OH-1.3/1

To 475 parts of polypropylene glycol of 2000 MW, were slowly and uniformly added 37.8 parts of 2,2-bis-(hydroxymethyl)propionic acid, 6.3 parts of 2-ethyl-2-hydroxymethyl-1,3-propanediol, 1.55 parts of 2,2'-methylenebis-(4-methyl-6-t-butylphenol) and 3.15 parts of 5-chloro-2-(3,5-di-t-butyl-2-hydroxyphenyl)benzotriazole and the mixture was stirred and heated under nitrogen to 75° C.; 119 parts of tolylene diisocyanate (80/20 mixture of 2,4 and 2,6-isomer) were slowly and uniformly added thereto and the mixture was stirred at 80°–85° C. for about 4 hours. The free NCO content of the prepolymer was about 2.0%.

An amount of 600 parts of the prepolymer was added to a stirred mixture of 970 parts of cold water, 140 parts of ice and 23.5 parts of triethylamine, and stirred at 5°–10° C. until emulsification was complete. After emulsification was complete, the mixture was stirred at 20° C. to 30° C for about 18 hours to chain-extend the polymer; the resulting latex contained about 34% solids.

A. To 232 parts of the chain-extended polyurethane polymer emulsion was added 37.5 parts of a second emulsion prepared by stirring at high speed 180 parts of water, 12 parts of TRITON® X-100, 220 parts of PARAPLEX® G-30 and 8 parts of TRITON® X-45, followed by 1.4 parts of ammonium hydroxide, and a dispersion of 16.4 parts of ACRYSOL® ASE-60 in 58.5 parts of water. After stirring at about 20° C. to 30° C. for about 24 hours, the adhesive composition had a viscosity of about 46,000 cps. and contained about 30% solids.

B. To 260 parts of the chain-extended polyurethane polymer was added 1.2 parts of ammonium hydroxide and a dispersion of 13.2 parts of ACRYSOL® ASE-60 in 35 parts of water. After stirring at 20° C. to 30° C. for about 24 hours the adhesive composition had a viscosity of about 53,000 cps. The viscosity was adjusted to 40,000 cps. by addition of water.

EXAMPLE 4

This example demonstrates that a softer hand is obtained when the flocking adhesive contains a plasticizer versus unplasticized adhesive. It also shows that the plasticizer can be added to the adhesive after the chain-extension takes place.

The flocking operation of Example 2 was repeated using the adhesive compositions of Example 3A and 3B. A comparison of the hands of the flocked fabrics showed that the fabric flocked with the adhesive of Example 3A, had a much softer hand than the fabric flocked with the adhesive of Example 3B.

EXAMPLE 5

This is an example of the preparation of an adhesive which falls within the prior-art reference of U.S. Pat. No. 3,640,924. The prepolymer of this adhesive does not contain any trimethylolpropane (TMP), or plasticizer, and has a higher NCO/OH (2/1) than the prepolymer of this invention.

An amount of 347 parts of polypropylene glycol, of 2000 MW, 11.3 parts of 2,2-bis-(hydroxymethyl)propionic acid, 2.2 parts of 5-chloro-2-(3,5-di-t-butyl-2-hydroxyphenyl)-benzotriazole and 1.1 parts of 2,2'-methylene-bis-(4-methyl-6-t-butylphenol) were mixed and heated to 80° C.; 91.0 parts of tolylene diisocyanate was added thereto and the mixture was maintained at 75°–80° C. for 3 hours. An amount of 200 parts of the prepolymer was emulsified by adding it to a mixture of 3.74 parts of triethylamine and 235 parts of cold water. The mixture was stirred overnight at room temperature, then filtered through a 100 mesh screen to obtain a latex having a solids content of about 46%. The latex was then thickened to a viscosity of 51,000 cps. having the addition of a dispersion of ACRYSOL® ASE-60 in water, the solids content of the final latex was 40%.

EXAMPLE 6

This is an example of flocking with a prior art adhesive. It shows that the unplasticized prior-art material has poorer abrasion resistance than the adhesive of this invention.

The adhesive composition of Example 5 was employed as a flocking adhesive using the method of Example 2, with a drying time 7 minutes at 275° F. The flocked fabric (139 grams) was then dyed by soaking for one hour in a dye bath containing 2.78 grams of Calcomine Scarlet B (Color Index No. 22,240), and 27.8 grams of sodium chloride in 4170 grams of water at 200° F. The dyed sample was then rinsed with cold water and dried. The appearance of the fabric was very poor. Evaluation of the flocked fabric using Taber Abraser CS-10 wheel with a 500 gram load, showed that the fabric appearance was poor after only 150 wet cycles. The hand of the flocked fabric was harsh.

EXAMPLE 7

This example illustrates the importance of the presence of TMP in the prepolymer A. The procedure of Example 3 was followed to prepare the prepolymer except that no 2-ethyl-2-hydroxymethyl-1,3-propanediol was added. An amount of 200 parts of the prepolymer was added to a mixture of 270 parts of cold water, 100 parts of ice and 7.5 parts of triethylamine and the mixture was allowed to stir at room temperature for 15 hours and then filtered through a 100-mesh screen. To 225 parts of the resulting latex was added 38.2 parts of another latex prepared by mixing at high speed 180 parts of water, 12 parts of TRITON® X-100, 220 parts of PARAPLEX® G-30 and 8 parts of TRITON® X-45, followed by the addition of 1.3 parts of concentrated ammonium hydroxide and a dispersion of 15.0 parts of ACRYSOL® ASE-60 in 70.8 parts of water to obtain a final viscosity of 49,000 cps.

EXAMPLE 8

This example illustrates that in the absence of TMP the flocked fabric had poor appearance after dyeing.

The adhesive composition of Example 7 was applied to 80$^2$ cotton twill according to Example 2 and dried for 5 minutes at 305°–310° F. The flocked fabric was dyed with Calcomine Scarlet B according to the procedure of Example 6. The fabric had a very poor appearance after drying overnight.

EXAMPLE 9

This example shows the preparation of an adhesive containing 0.5% TMP in the prepolymer.

The procedure of Example 3 was followed except that 3.15 parts of 2-ethyl-2-hydroxymethyl-1,3-propanediol was added. The prepolymer was then chain extended as in Example 7 Part A. To 225 parts of the resulting latex was added 38.1 parts of the second emulsion described in Example 3 Part A, followed by the addition of 1.0 part of concentrated ammonium hydroxide and a dispersion of 11.8 parts of ACRYSOL® ASE-60 in 73.9 parts of water to obtain a final viscosity of 20,000 cps.

EXAMPLE 10

This example shows that poor abrasion resistance results with only 0.5% TMP in the prepolymer.

The adhesive of Example 9 was applied to $80^2$ cotton twill according to Example 2 and dried for 5 minutes at 305°–310° F. The flocked fabric was dyed according to Example 7. The dyed fabric had a good appearance but after 500 wet cycles in a Taber Abraser Instrument using a CS-10 wheel and a 500 gram load the appearance was very poor.

I claim:

1. A process for preparing a polyurethane textile adhesive composition in the form of an aqueous dispersion comprising the steps of:
  1. forming an isocyanate-terminated prepolymer in the presence of from about 10 to 30% by weight thereof of a low molecular weight polymeric plasticizer, by the reaction of from about 1.0 to 1.7 moles of tolylene diisocyanate per mole of a mixture of three hydroxy compounds consisting of:

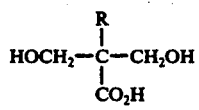
(a)

wherein R is hydrogen, or lower alkyl,

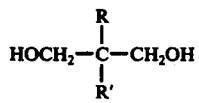
(b)

wherein R is hydrogen, or lower alkyl, and R' is lower hydroxyalkyl, and

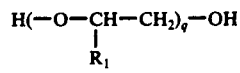
(c)

wherein $R_1$ is hydrogen, or lower alkyl, and q is an integer sufficiently large to provide an average molecular weight from about 1750 to about 5,000, the molar ratio of (a) to (b) to (c) ranging from 2.0-7.5: 1.0: 2.0-7.5

2. forming a latex by stirring said isocyanate-terminated prepolymer mixture in an aqueous medium containing a tertiary amine until all of the residual isocyanate groups have reacted with water;
  3. adjusting the viscosity of the latex by adding a thickening agent thereto;
  4. applying the composition obtained from step (3) to a textile material or other material; and
  5. forming an adhesive bond between said textile material or said other material and another textile material with said composition.

2. The process of claim 1, wherein said isocyanate-terminated prepolymer is formed in the presence of about 15–25% by weight thereof of a low molecular weight polymeric plasticizer, having a molecular weight ranging from about 500 to about 1000.

3. The process of claim 1 wherein the tertiary amine is a tertiary aliphatic amine.

4. A process according to claim 1 wherein said other material is a flocked textile material.

5. The product as obtained according to claim 1.

6. The process of claim 1 wherein said isocyanate-terminated prepolymer is formed by the reaction of about 1.2 to about 1.4 moles of tolylene diisocyante per mole of a mixture of three hydroxy compounds.

7. The process of claim 1 wherein the molar ratios of hydroxy compounds (a) to (b) to (c) ranges from 2.5–5.0: 1.0: 2.5–5.0.

8. The process of claim 1 wherein the molar ratios of hydroxy compounds (a) to (c) ranges from 0.5–2.0: 1.0.

9. The process of claim 1 wherein said tertiary amine is triethyl amine.

10. The process of claim 1 wherein viscosities of thickened adhesive compositions range from about 500 to about 150,000 cps.

11. The process of claim 1 wherein the thickening agent is an acid-containing, cross-linked copolymer emulsion.

* * * * *